United States Patent [19]

Penna

[11] Patent Number: 4,649,380
[45] Date of Patent: Mar. 10, 1987

[54] VIDEO DISPLAY SYSTEM COMPRISING AN INDEX STORE FOR STORING REDUCED VERSIONS OF PICTURES TO BE DISPLAYED

[75] Inventor: David E. Penna, Redhill, England

[73] Assignee: U. S. Philips Corporation, New York, N.Y.

[21] Appl. No.: 618,977

[22] Filed: Jun. 11, 1984

[30] Foreign Application Priority Data

Jun. 15, 1983 [GB] United Kingdom ............... 8316268

[51] Int. Cl.⁴ ................................ G09G 1/14
[52] U.S. Cl. .................... 340/750; 340/721; 340/731; 340/703; 340/728
[58] Field of Search ............... 340/701, 703, 721, 722, 340/728, 731, 745, 750, 799; 364/188; 358/77; 382/47, 56

[56] References Cited

U.S. PATENT DOCUMENTS

| Re. 30,666 | 7/1981 | Mitchell et al. | 434/307 |
| 4,109,938 | 8/1978 | Mitchell et al. | 434/365 |
| 4,366,475 | 12/1982 | Kishi et al. | 340/731 |
| 4,396,977 | 8/1983 | Slater et al. | 340/722 |
| 4,410,958 | 10/1983 | Demke et al. | 340/721 |
| 4,418,345 | 11/1983 | Demke et al. | 340/721 |
| 4,528,693 | 7/1985 | Pearson et al. | 340/731 |

OTHER PUBLICATIONS

IBM Technical Disclosure, G. T. Webb, Combination of Alphanumeric and Formatting Data on CRT Display, vol. 15, No. 7, Dec. 1972.

Primary Examiner—Gerald L. Brigance
Assistant Examiner—Jeffery A. Brier
Attorney, Agent, or Firm—Thomas A. Briody; Jack Oisher; William J. Streeter

[57] ABSTRACT

A video display system includes a television monitor 1, a display generator 2, a display memory 3, a processor 4, and a main memory 13. The main memory 13 stores pages of text and pictures which can be selected for display. When a page is selected, the processor 4 controls its transfer from the main memory to the display memory where it is accessed by the display generator to produce the R, G, B display signals. The main memory 3 includes an index store 18 which contains indexing information which can be displayed in the form of index pages containing miniature aide memoire versions of the stored pages. In the aide memoire version of a text page, single dots represent respective characters of the text page. In the aide memoire version of a picture page, single dots represent respective discrete areas of the picture page. In the latter case, each dot has a color which is the average color of the area concerned.

5 Claims, 7 Drawing Figures

VIDEO DISPLAY SYSTEM COMPRISING AN INDEX STORE FOR STORING REDUCED VERSIONS OF PICTURES TO BE DISPLAYED

BACKGROUND OF THE INVENTION

This invention relates to a video display system comprising, a display device for displaying, selectively, pages of information by means of pixels in a static display frame, a display generator for producing, for application to the display device, video signals which pertain to the information of a page selected for display, a display memory for storing, in digital form, the information of a page to be displayed, and a processor for controlling digitally the storage, selection and display of information.

Such a system is known from, for instance, European Patent Application No. 82200241.6 and U.K. Patent Application No. 2 032 740A.

As presently envisaged, the display generator of the system is arranged to produce video signals which are suitable for driving a television monitor. However, the possibility does exist for the information display to be effected using some other form of display device, for instance, a liquid crystal display device. The video signals produced by the display generator would then be appropriate for such an alternative.

The system can be operable to display pages of information in the form of both pictures (graphics) and text, with and without color. For the purposes of the present specification, a page of information will be denoted as either a picture page or a text page depending on whether it is predominately pictorial or textual in context.

A problem that exists with a system of the above character is to provide a suitable index by which the different picture and text pages can be readily identified for selection and display. In a known method of indexing, there is provided a list of items which identify the different pages, this list forming the information of at least one text page which is available for display at the command of a viewer. In general, such a list of items can be composed of an individual title or code number for each page. However, when the number of pages which are available for display is considerable, it may not be possible to identify readily a required page simply by recognition of its title or code number, so that trial and error selection of a page for display may result.

SUMMARY OF THE INVENTION

With a view to mitigating the above problem, the present invention proposes an alternative means of identifying pages for their selection and display.

According to the present invention, a video display system, of the character set forth above and including an index store in which can be stored selectively displayable index pages containing indexing information for identifying a plurality of different pages of information stored in a main memory, is characterized in that indexing means are provided for generating the indexing information in such a form as to display, in discrete display areas of each index page, respective miniature *aide memoire* versions of pages of information which are available for selection in the main memory, the indexing means being operable to produce the indexing information for an *aide memoire* version of a page from the information for that page.

A video display system according to the invention thus provides index pages containing a number of small reduced resolution versions of the pages which are available for display, so that a viewer can select a page by its actual appearance instead of simply relying on a title or code number. As will be described, the *aide memoire* version of a text page will not be legible in a preferred embodiment of the invention, but its overall shape as defined by headings and paragraphs, and also any colors used for text and background, will help in the recognition.

Each index page, as displayed, can include, in a respective key area for each possible index page, including itself, a pattern of discrete dots denoting each of the discrete display areas which are occupied in that index page by an *aide memoire* version of a page which is available for display.

These key areas enable the available capacity of each index page to be seen from any index page which is displayed. Thus, when fresh information for further pages is to be stored in the main memory, it can readily be deduced which index pages have unoccupied display areas for accommodating the *aide memoire* versions of these further pages.

In the case of a text page, the corresponding *aide memoire* version can be formed by displaying each character of the text as a single dot. In the case of a picture page, the corresponding *aide memoire* version can be formed by displaying discrete areas of the picture as single dots, the color of each of which is determined by averaging the colors of the area concerned. In order to limit the number of colors which would otherwise be required with such averaging, the color selected for displaying a dot can be approximated to one of a standard set of colors. Both techniques can be employed for composite pages comprising both pictorial and textual information.

DESCRIPTION OF THE DRAWINGS

In order that the invention may be more fully understood reference will now be made, by way of example, to the accompanying drawings, of which.

DESCRIPTION OF THE PREFERRED EMBODIMENT

Figure 1:
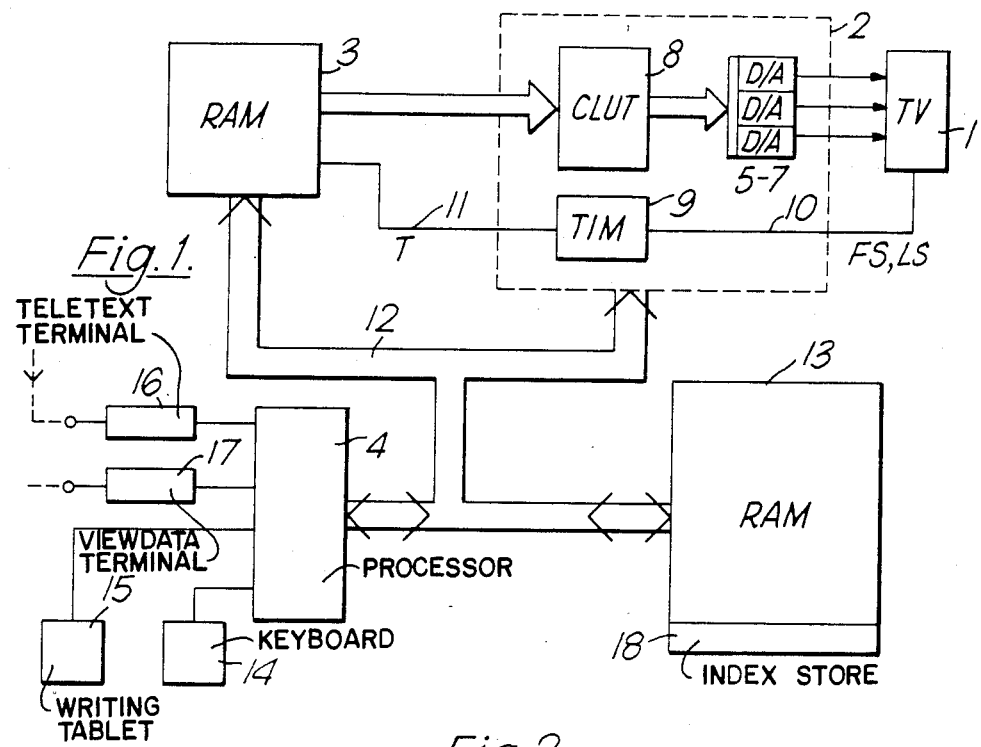
FIG. 1 shows a block diagram of a video display system embodying the invention.

Referring to the drawings, the video display system shown in FIG. 1 comprises a display device 1, a display generator 2, a display memory 3 and a processor 4. The display device 1 is suitably a color television monitor (TV) which is connected to receive R,G,B, video signals from the display generator 2. These R,G,B, video signals are produced in the display generator 2 by three digital-to-analog converters (D/A) 5, 6 and 7, respectively. The display generator 2 also includes a color look-up table (CLUT) 8 which is suitably a read-only memory and is responsive to digital information from the display memory 3 to produce digital signals for driving the converters 5, 6 and 7. A display timer (TIM) 9 in the display generator 2 provides line and field synchronization signals LS and FS for the television monitor 1 over a connection 10: the timer 9 also provides over a connection 11, timing signals T for controlling the transfer of digital information from the display memory 3 to the color look-up table 8.

The display memory 3 is suitably a randon-access memory (RAM) which has a capacity for storing at least one page of information. A combined address/data bus 12 interconnects the display generator 2 and the display memory 3 with the processor 4. A main memory 13, which is also in the form of a random-access memory (RAM), is also connected to the address/data bus 12. Interface apparatus in the form of a keyboard 14 and a writing tablet 15 are connected to the processor 4. Also, a teletext terminal apparatus 16 gives access to broadcast teletext television services such as CEEFAX and ORACLE, and a viewdata terminal apparatus 17 provides a link to a telephone line for access to external data-bases such as PRESTEL.

In operation of the system, pages of information can be generated by the interface apparatus 14 and 15 and stored in the main memory 13. Also, further pages of information can be acquired by means of the teletext and viewdata terminals 16 and 17 and stored in the main memory 13. Any page of information stored in the main memory 13 can thereafter be selected for display. When a page is selected, the information thereof is transferred from the main memory 13 to the display memory 3.

When the number of pages of information stored in the main memory 13 is considerable, it becomes expedient to provide some form of index by which the stored pages can be readily identified. In accordance with the present invention, there is provided an index store 18, which conveniently is contained in the main memory 13. Whenever, a page of information, produced from any one of the elements 14–17, is to be stored in the main memory 13, indexing information for identifying the page is produced and stored in the index store 18. In this respect, the central processor 4, which is suitably a commercially available microcomputer, is programmed to function as indexing means to produce the indexing information in such a form as to represent a miniature *aide memoire* version of the page of information concerned.

Figure 2:
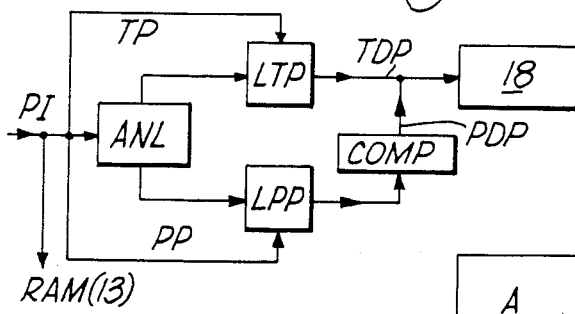
FIG. 2 shows diagrammatically certain logic functions which are implemented in the performance of the invention.

More specifically, as illustrated in FIG. 2, page information PI to be stored in the main memory (RAM) 13 is analyzed by a logic function ANL to determine whether the page is a picture page PP or a text page TP. This determination may be effected either by the user, or by the display system itself. When it is effected by the user, respective identifier flags may be allotted to the two types of page. When it is effected by the system itself, identifier flags may also be used, being, for example, set by the interface apparatus used to generate the page. Alternately, the processor 4 may determine the type of page on the basis of the amount of memory used to store the page.

If the display page is a text page, then a logic function LTP produces a dot pattern TDP in which each character of the text page is represented by only a single dot. This dot pattern is fed to the index store 18. If the page is a picture page PP, then a logic function LPP examines the page information for successive discrete areas of the picure and produces averaging information which represents an average color for each area, in turn. This averaging information is compared (COMP) with stored information representing a standard set of colors, and the stored information of the color nearest to the average color is fed to the index store 18 in a dot pattern PDP.

It has been found that satisfactory results are obtained by effecting a picture size reduction by a factor of four in the linear dimensions. Thus, each pixel in a miniature picture corresponds to an area of 4×4 pixels in the original. Conveniently, the color of the single pixel used to represent the 4×4 pixel area is calculated by taking separate averages of the gamma corrected R, G and B values of the 16 pixels in the original, and then carrying out the inverse gamma correction on the result.

Since this technique would produce a large number of different colors in the miniature picture, it is preferred to approximate to a standard set of colors, as aforesaid. A suitable set can be obtained by allowing the R, G and B components to each take only one of 5 equally spaced brightness levels.

Figure 3:
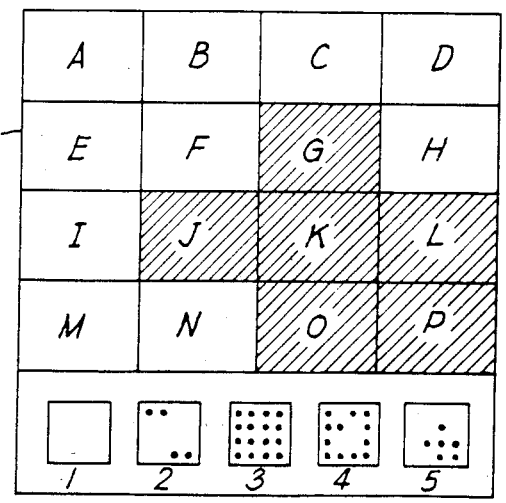
FIG. 3 shows the format for a typical index page.

The indexing information which is stored in the index store 18 is organized under the control of the processor 4, into index pages which are selectable for display at the command of a viewer. As displayed, each index page comprises a plurality of discrete display areas each of which can occupy a miniature *aide memoire* version of a page of information stored in the main memory 13. The format of an index page is illustrated in FIG. 3. An index page 19 there shown has an effective grid, or matrix, of 16 (sixteen) discrete display areas A to P. Conveniently, these areas are defined by thin boundary lines. The areas G,J,K,L,O,P are filled with crosshatching to signify that they are occupied by respective miniature *aide memoire* versions of stored pages. Each of these reduced resolution versions are produced in the manner already described, depending on whether the appertaining page is a text page or a picture page. The index page 19 also includes five key areas numbered 1 to 5. Each of these key areas shows the extent of occupancy of a respective one of five index pages by an appropriate pattern of discrete dots. Each dot denotes which discrete areas are occupied in the appertaining index page. The key area 5 pertains to the index page 19 shown, so that there is correspondence between the pattern of dots in this key area and the occupied display areas in this index page. Of course, other formats of an index page are possible: in particular, more or less than 16 display areas can be provided. Also, the number of key areas can be different in dependence on a greater or lesser number of index pages.

Referring now to the flow charts shown in FIGS. 4 to 7, the various instruction and decision boxes given therein are executed under control of the processor 4 and have the following significance.

Figure 4:
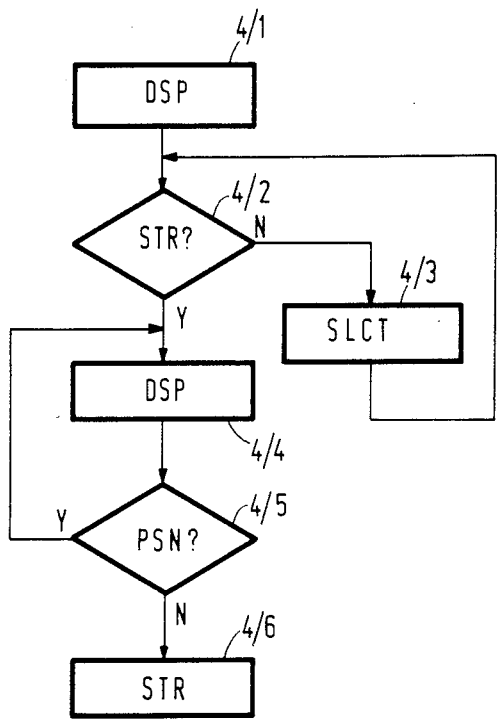
FIG. 4 shows, in the form of a flow chart, a broad outline of the processor operation to store an *aide memoire* version of a display page.

Flow Chart of FIG. 4

4/1—DSP: This is an instruction to display the first index page.

4/2—STR?: Is a mini-picture (*aide memoire* version) of a display page to be stored in the first (displayed) index page? (The answer to that question is signified by the user).

4/3—SLCT: This is an instruction for the user to select a further index page for display.

4/4—DSP: This is an instruction for the user to select a display area of the displayed index page.

4/5—PSN?: The processor determines if the selected key area is occupied?

4/6—STR: This is an instruction to store a mini-picture in the selected display area.

Figure 5:
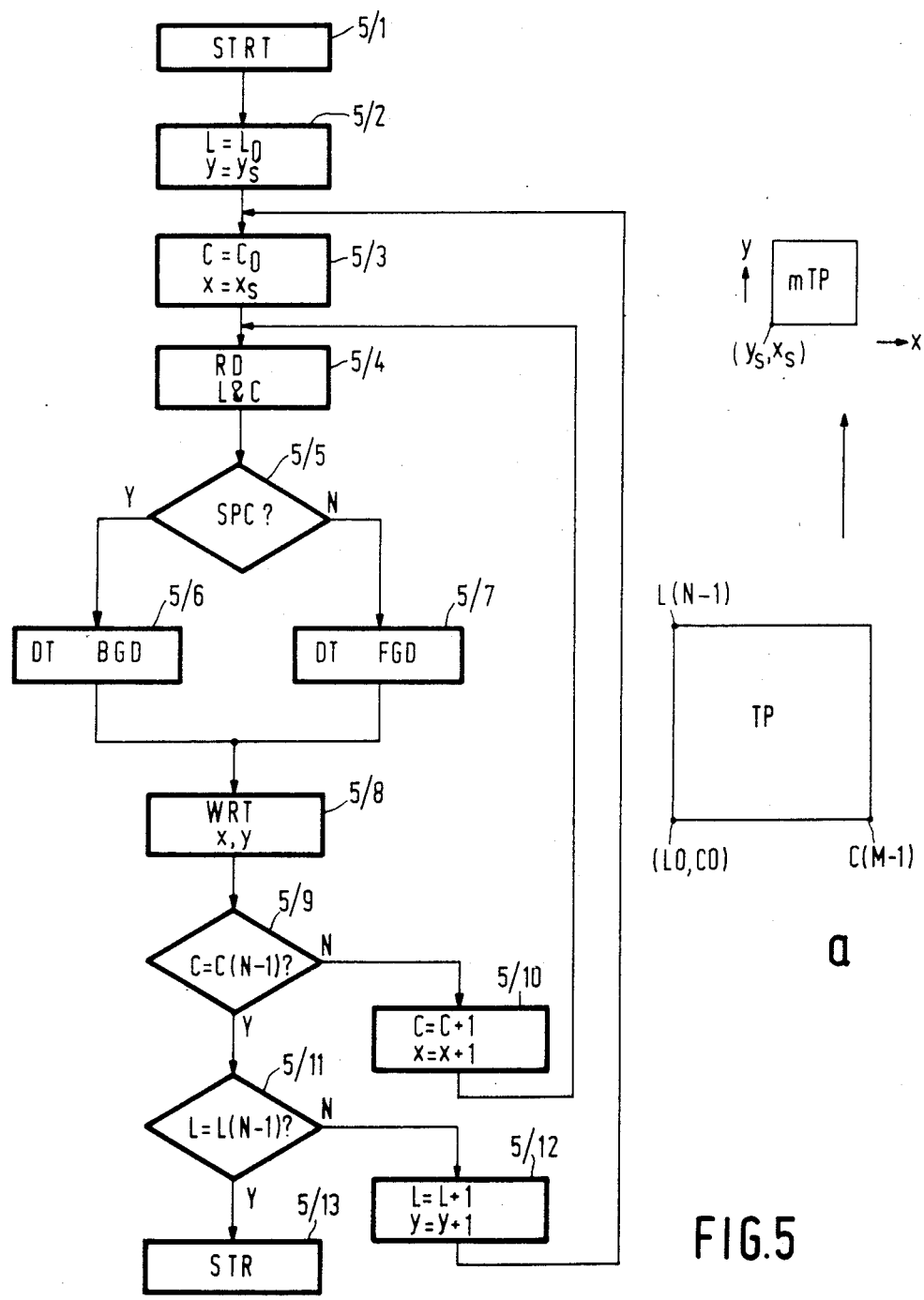
FIG. 5 shows, in the form of a flow chart, the processor operation involved in producing an *aide memoire* version of a text page.

Flow Chart of FIG. 5

5/1—STRT: Start of the processor operation involved in producing an *aide memoire* version of a text page. (For a text page TP, N character lines L0 to L(N−1), and M character positions C0 to C(M−1) are assumed. The corresponding mini-picture mTP has a dot matrix xy—see insert (a) in FIG. 5).

5/2—L=L0
  $y=y_s$: These two instructions set the starting positions for the text page and the mini-picture, respectively, in the vertical direction.

5/3—C=C0
  $x=x_s$: These two instructions set the starting positions for the text page and the mini-picture, respectively, in the horizontal direction.

5/4—RD L & C: This instruction causes the character at line L, column C to be read.

5/5—SPC?: The processor determines if the read character is a space or not?.

5/6—DT BGD: This is an instruction to produce a dot in the background color to represent a space.

5/7—DT FGD: This is an instruction to produce a dot in the foregound color to represent a character.

5/8—WRT x,y: This is an instruction to write the appropriate dot at position x,y.

5/9—C=C(M−1)?: the processor determines if the last character position in the current character line has been reached or not?

5/10—C=C+1
  x=x+1: These are instructions to increment by one the values of C and x, respectively, when this last character position has not been reached.

5/11—L=L(N−1)?: The processor determines if the last character line has been reached or not?

5/12—L=L+1
  y=y+1: These are instructions to increment by one the values of L and y, respectively, when the last character line has not been reached.

5/13—STR: This is an instruction to store the mini-picture that has been produced when all the character lines of the text page have been dealt with.

Figure 6:
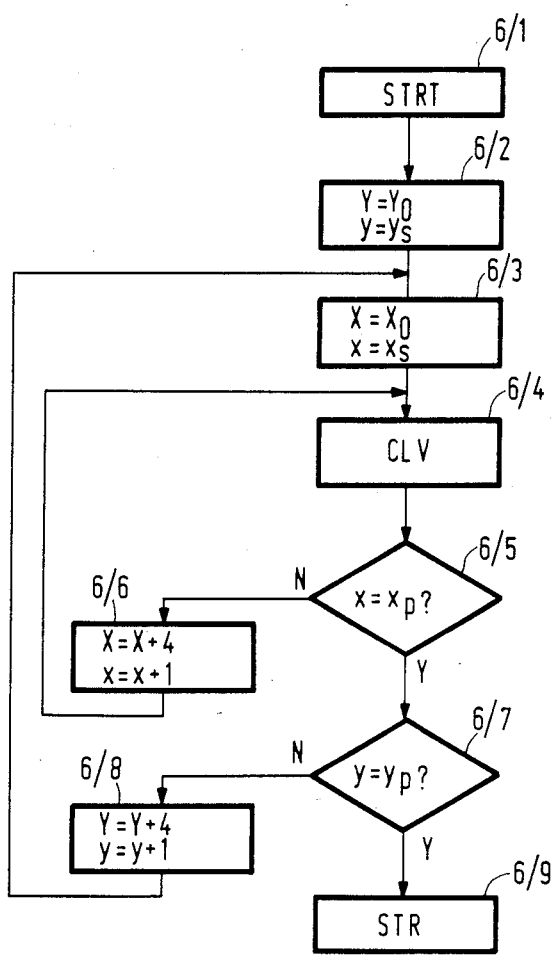
FIG. 6 shows, in the form of a flow chart, the processor operation involved in producing an *aide memoire* version of a picture page.
Figure 6:
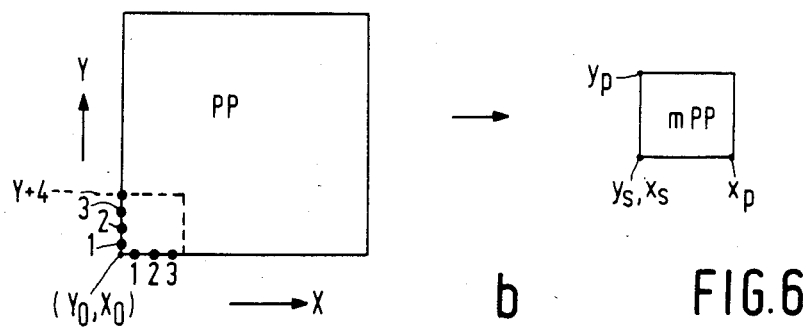

Flow Chart of FIG. 6

6/1 STRT: Start of the processor operation involved in producing an *aide memoire* version of picture page. (For a picture page PP, a dot matrix XY is assumed. The corresponding mini-picture mPP has a dot matrix xy, as in FIG. 5—see insert (b) in FIG. 6).

6/2—Y=Y0
  $y=y_s$: These two instructions set the starting positions for the picture page and the mini-picture, respectively, in the vertical direction.

6/3—X=X0
  $x=x_s$: These two instructions set the starting positions for the picture page and the mini-picture, respectively, in the horizontal direction.

Figure 7:
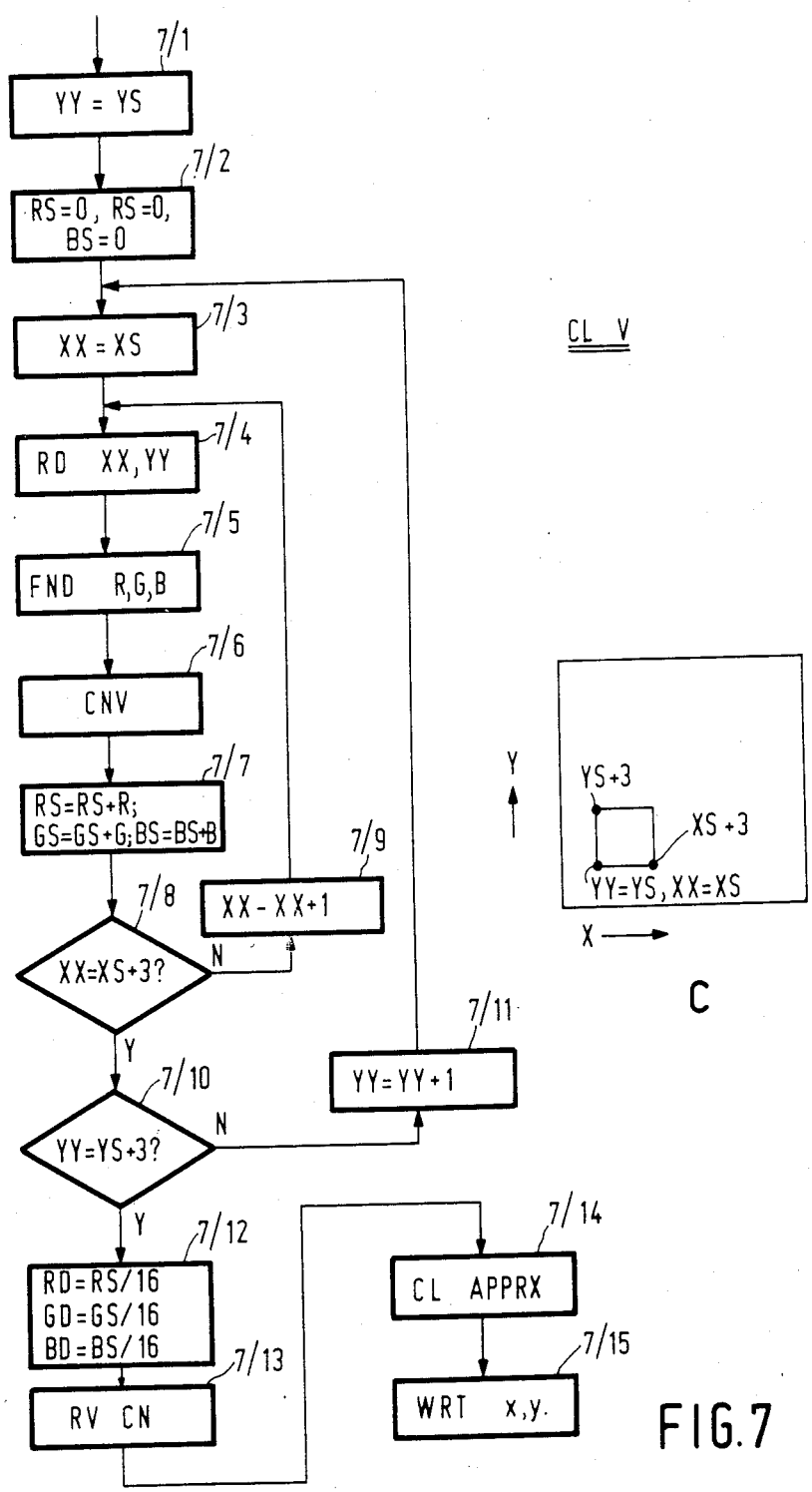
FIG. 7 shows, in the form of a flow chart, the processor operaions involved for determining the color average of a picture cell.

6/4—CL V: This is a processor operation to produce, for the mini-picture, single dots, each of a selected color, from successive cells of 16 dots in the picture page. The flow chart in FIG. 7 illustrates this operation.

6/5—x=xp?: The processor determines if the last dot position xp (in the x-direction) of the mini-picture been reached or not?

6/6—X=X+4: This is an instruction to increment by four the
  x=x+1: value X, and an instruction to increment by one the value x, when xp has not been reached.

6/7—y=yp?: The processor determines if the last dot position yp (in the y-direction) for the mini-picture been reached or not?

6/8—Y=Y+4:
  y=y+1: This is an instruction to increment by four the value Y, and an instruction to increment by one the value y, when yp has not been reached.

(Until both the limit positions xp and up have been reached, the processor operation CL V will be repeated for each increment of x).

6/9—STR: This is an instruction to store the mini-picture that has been produced when all the picture cells of the picture page have been dealt with.

Flow Chart of FIG. 7

This flow chart illustrates the processor operation CL V mentioned in FIG. 6. (Insert (C) shows a 4×4 pixel picture cell comprised by four pixels YS to YS+3 in the vertical direction and four pixels XS to XS+3 in the horizontal direction.)

7/1—YY=YS: This is an instruction to set, in the Y-direction, the starting position for each 4×4 picture cell.

7/2—RS=0, GS=0, BS=0: This is an instruction to set RGB sum values at 0.

7/3—XX=XS: This is an instruction to set, in the X-direction, the starting position for each 4×4 picture cell.

7/4—RD XX, YY: This is an instruction to read the pixel at position XX, YY.

7/5—FND R,G,B,: This is an instruction to determine the values of the R G B components for that pixel.

7/6—CNV: This is an instruction to do a gamma conversion of the determined R G B component values.

7/7—RS=RS+R:
  GS=GS+G:
  BS=BS+B: This is an instruction to add the determined R G B component values to those already determined (if any).

7/8—XX=XS+3?: The processor determines if this is the last pixel or not of the cell in the X-direction?

7/9—XX=XX+1: This is an instruction to increment by one the value XX if it is not.

7/10—YY=YS+3?: The processor determines if this is the last pixel or not of the cell in the Y-direction?

7/11—YY=YY+1: This is an instruction to increment by one the value YY if it is not.

7/12—RD=RS/16:
  GD=GS/16:
  BD=BS/16: This is an instruction to determine averaged values RD, GD and BD for the 16 summed R G B component values of the picture cell dealt with.

7/13—RV CN: This is an instruction to reverse the gamma conversion of the averaged values RD, GD and BD.

7/14—CL APPRX: This is an instruction to approximate the averaged values to values for a standard color.

7/15—WRT x,y: This is an instruction to write a dot at position x,y to represent the picture cell dealt with.

I claim:

1. A video display system comprising a data processor connected by a communication bus whereto there are also connected a display memory, a video generator and a main memory, said display memory being provided for storing, in digital form, video information of an image to be displayed, said video generator being provided for producing video signals from said video information, said video generator having an output connected to a display device for displaying said image by means of pixels in a static display frame, the transfer of said video information from said display memory to said video generator being controlled by said data processor, which also comprises input means for receiving pages of information supplied from outside the system and being provided for controlling the storage of received pages into the main memory, said data processor being further provided with indexing means for generating indexing information of a received page by reducing the scale of a received page in order to form a miniature *aide memoire* version of that received page, said indexing means being also provided for storing said indexing information into an index store and for annexing an indicator to said indexing information indicating the location in said main memory wherein the page, upon which said *aide memoire* version was generated, is stored, said index store having a capacity for storing at least one index page comprising a plurality of said *aide memoire* versions, said data processor being provided for controlling the transfer of an index page from said index store to said display memory in order to display said index page as an image on said display device, said system further comprises selection means for selecting one of the indexing information of the displayed index page, said selection means being provided for enabling, by using the indicator of the selected index information, the transfer of the selected page from said main memory to said display memory.

2. A video display system as claimed in claim 1, wherein said indexing means is provided for generating the indexing information of a received picture page by dividing said picture page into discrete areas and by reducing each of said discrete areas into a respective single dot, said indexing means being further provided for determining the color of each of said single dots by averaging the colors of the concerned discrete area.

3. A video display system as claimed in claim 2, wherein said indexing means comprises a color table for storing a standard set of colors, and a comparator for comparing the determined average color of a single dot to the colors of said color table and for selecting that color of said color table which is the nearest to said determined average color and providing that single dot with the selected color.

4. A video display system as claimed in claim 1, wherein said system comprises detecting means for detecting whether a received page is a text page or a picture page, said detecting means being provided for generating a first or a second signal upon detection of a text page or a picture page, respectively, said first signal defining a dot pattern in which each character of the text page is represented by a single dot, said second signal defining a further dot pattern in which each of discrete area of the picture page is represented by a further single dot.

5. A video display system as claimed in any preceding claim, wherein said index store is part of said main memory.

* * * * *